United States Patent [19]

Hamp, III et al.

[11] Patent Number: 4,888,821
[45] Date of Patent: Dec. 19, 1989

[54] SYNCHRONIZATION CIRCUIT FOR A RESONANT FLYBACK HIGH VOLTAGE SUPPLY

[75] Inventors: Charles H. Hamp, III; Paul F. L. Weindorf, both of Albuquerque, N. Mex.

[73] Assignee: Honeywell Inc., Minneapolis, Minn.

[21] Appl. No.: 282,436

[22] Filed: Dec. 9, 1988

[51] Int. Cl.[4] .......................................... H02M 3/335
[52] U.S. Cl. .......................................... 363/21; 363/61
[58] Field of Search .................................... 363/21, 61

[56] References Cited

U.S. PATENT DOCUMENTS

| | | | |
|---|---|---|---|
| 3,618,130 | 11/1971 | Garuts | 363/21 |
| 4,196,465 | 4/1980 | Buschor | 363/61 |
| 4,276,586 | 6/1981 | Boekhorst | 363/97 |
| 4,371,917 | 2/1983 | Bator | 363/21 |
| 4,616,300 | 10/1986 | Santelmann | 363/61 |
| 4,709,316 | 11/1987 | Ngo et al. | 363/21 |
| 4,772,995 | 9/1988 | Gautherin et al. | 363/21 |

FOREIGN PATENT DOCUMENTS 3640705 2/1988 Fed. Rep. of Germany .
87167 4/1988 Japan .

*Primary Examiner*—William H. Beha, Jr.
*Attorney, Agent, or Firm*—Haugen and Nikolai

[57] ABSTRACT

A synchronization circuit for a resonant flyback high voltage supply for use in providing a high voltage output for a CRT. The circuit includes driving circuitry including an input power filter providing power to a coupled inductor which transmits power to a four stage multiplier circuit. Power is switched on and off by a power FET. The synchronization circuit reduces power loss in the FET by using variations in operational frequency to meet varying loads. By reducing the frequency as load increases, the flyback waveform is allowed to complete its resonant cycle before turning on the power FET. An anode resonant flyback regulator including a pulse width modulator controls the FET in response to signals provided by a negative slope detector circuit and feedback voltage. Over current shutdown capability is further provided by a current sensing latch.

4 Claims, 4 Drawing Sheets

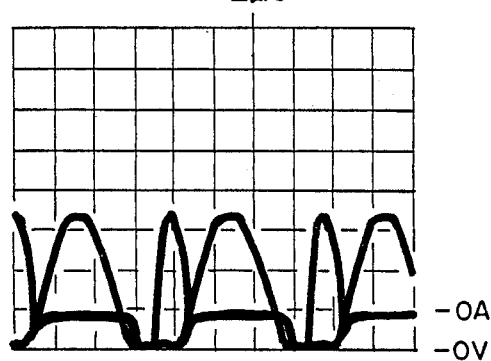
Fig. 7A  Q6 SOURCE CURRENT UNDER NO LOAD
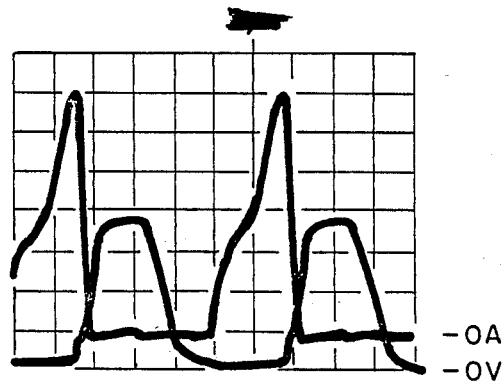
Fig. 7B  Q6 SOURCE CURRENT UNDER FULL LOAD
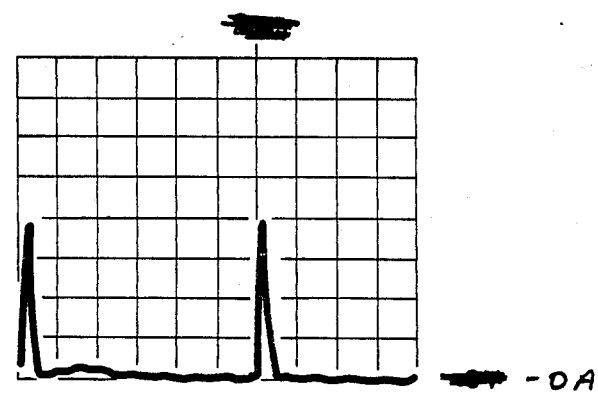
Fig. 7C  Q6 SOURCE CURRENT WITH T1 PRIMARY SHORTED

SYNCHRONIZATION CIRCUIT FOR A RESONANT FLYBACK HIGH VOLTAGE SUPPLY

FIELD OF THE INVENTION

The invention relates generally to high voltage power supplies used in electrical apparatus and, more particularly, to a synchronization circuit for a resonant flyback high voltage supply for providing a high voltage output for the anode of a CRT.

BACKGROUND OF THE INVENTION

The development of new high resolution CRTs capable of dissipating up to 36 watts at the anode has created the need for a high voltage power supply capable of providing 75 watt peaks and a 36 watt continuous signal to the anode output with high efficiency under heavy loads in order to reduce both electrical and thermal component stress. Previous high voltage power supply designs developed less output power and, therefore, were not as concerned with thermal and electrical stress due to low efficiencies. The invention is designed to work as part of a resonant flyback high voltage supply such as the type described in "Designing Ultra-Efficient High Voltage supplies Using a High-Frequency Frequency Resonant Flyback Technique", William Santelmann, Jr., 1982 Proceedings of Powercom 9, G1-2, p.1 (hereinafter referred to as "Santelmann"). Another concept which serves as background for the invention is detailed by T. K. Phelps in "Optimizing the design of Switch-Mode Power Conditioners Using Capacitive Voltage Multipliers", 1981 Proceedings of Powercon 8, I-1, pp. 1–7.

One type of known power supply operates at a fixed frequency. To meet increasing load requirements, a power switch, usually an FET, must turn on at increasing drain voltages. This allows more charging time for the coupled inductor.

Other known supplies operate at a fixed frequency. In such supplies, increased load requirements are met by producing an increased gate voltage on the power switch FET. This provides more current to the coupled inductor and in turn more energy to the multiplier stage. The shortcomings of such known power supplies stem from their fixed frequency operation.

One such deficiency of prior art power supplies that increased load requirements are met by increasing coupled inductor charging time by turning on the power switch FET at higher voltage levels on the flyback waveform thereby dropping greater voltages across the FET. FET power dissipation rapidly increases under increasing loads and becomes the limiting factor in power efficiency.

In another type of known power supply, the FET gate voltage is varied in order to regulate the FET's drain-source resistance, Rds, which in turn controls the coupled inductor charging current. At low loads, the gate voltage approaches Vth thereby driving Rds up, thereby dissipating needless power in the FET.

The invention overcomes the deficiencies in the prior art by using variations in frequency to meet varying anode loads. By reducing the frequency as load increases, the invention allows the flyback waveform to complete its resonant cycle before turning on the power switch FET. The power switch FET is turned on when the drain voltage decreases to 0 volts, thus eliminating the extra power dissipation encountered in previous designs. Santelmann, for example, does not recognize the critical timing required to turn on the gate of the power switch FET at the proper time. Santelmann teaches at Page 7, fifth paragraph, that the gate of the power switch FET may be turned on at any time when negative current flows through it (see also Snatelmann FIG. 2). While this unsynchronized approach may appear to be somewhat acceptable under light load conditions, the present invention recognizes that it will not satisfy full load conditions because the amount of "dead time" between the drain current beginning a positive rise and the drain voltage discharge of the circuit to 0 volts as shown in FIG. 7B herein and FIG. 8 of Santelmann, for example, is extremely short and, in fact, the drain current never goes negative. The invention recognizes for the first time that it is critical that the power switch FET, be turned on when the drain voltage has fallen to its minimum value, determined by a greatly reduced dv/dt on the falling slope of the drain waveform. This feature of the invention is explained in detail below with reference to FIGS. 3–7.

The power switch FET gate drive voltage on the supply of the invention turns the power switch FET on fully thereby driving the FET Rds parameter to its specified minimum. Some types of known supplies do not drive the gate full on, therefore Rds is not driven to its minimum specified limit. Thus, FET power loss due to coupled inductor charging current through Rds increases thereby limiting the efficiency of the power supply.

SUMMARY

A synchronization circuit for a resonant flyback high voltage supply for use in providing a high voltage output for a CRT or other high voltage application is disclosed. The circuit includes driving circuitry including an input power filter providing power to a coupled inductor which transmits power to a four stage multiplier circuit. Power is switched on and off by a power FET. The synchronization circuit reduces power loss in the FET by using variations in operational frequency to meet varying loads. By reducing the frequency as load increases, the flyback waveform is allowed to complete its resonant cycle before turning on the power FET. An anode resonant flyback regulator including a pulse width modulator controls the FET in response to signals provided by a negative slope detector circuit and feedback voltage. Over current shutdown capability is further provided by a current sensing latch.

The power supply of the invention decreases in frequency in order to meet increased loads. The increase in period is primarily done to the additional charging time needed to meet output load requirements.

It is one objective of the invention to provide a power supply for driving CRTs which decreases in output signal frequency in order to meet increased load.

It is one object of the invention to provide a synchronization circuit for use in a resonant flyback high voltage power supply.

It is yet another object of the present invention to provide apparatus to reduce power loss in power switch FETs and increase efficiency in a resonant flyback high voltage power supply.

It is yet another object of the invention to provide circuit protection apparatus for power switch FETs used in high voltage power supplies.

Other objects, features and advantages of the invention will become apparent to those skilled in the art through the detailed description, claims and drawings herein wherein like reference numerals denote like elements.

BRIEF DESCRIPTION OF THE DRAWINGS

FIGS. 7A-7C graphically shows three Q6 source current waveforms under varying load conditions from one example of an embodiment of the invention incorporated in the circuit shown in FIG. 12.

FIGS. 7A and 7B also show the Q6 drain voltages.

DETAILED DESCRIPTION OF THE PREFERRED EMBODIMENT

Figure 1:
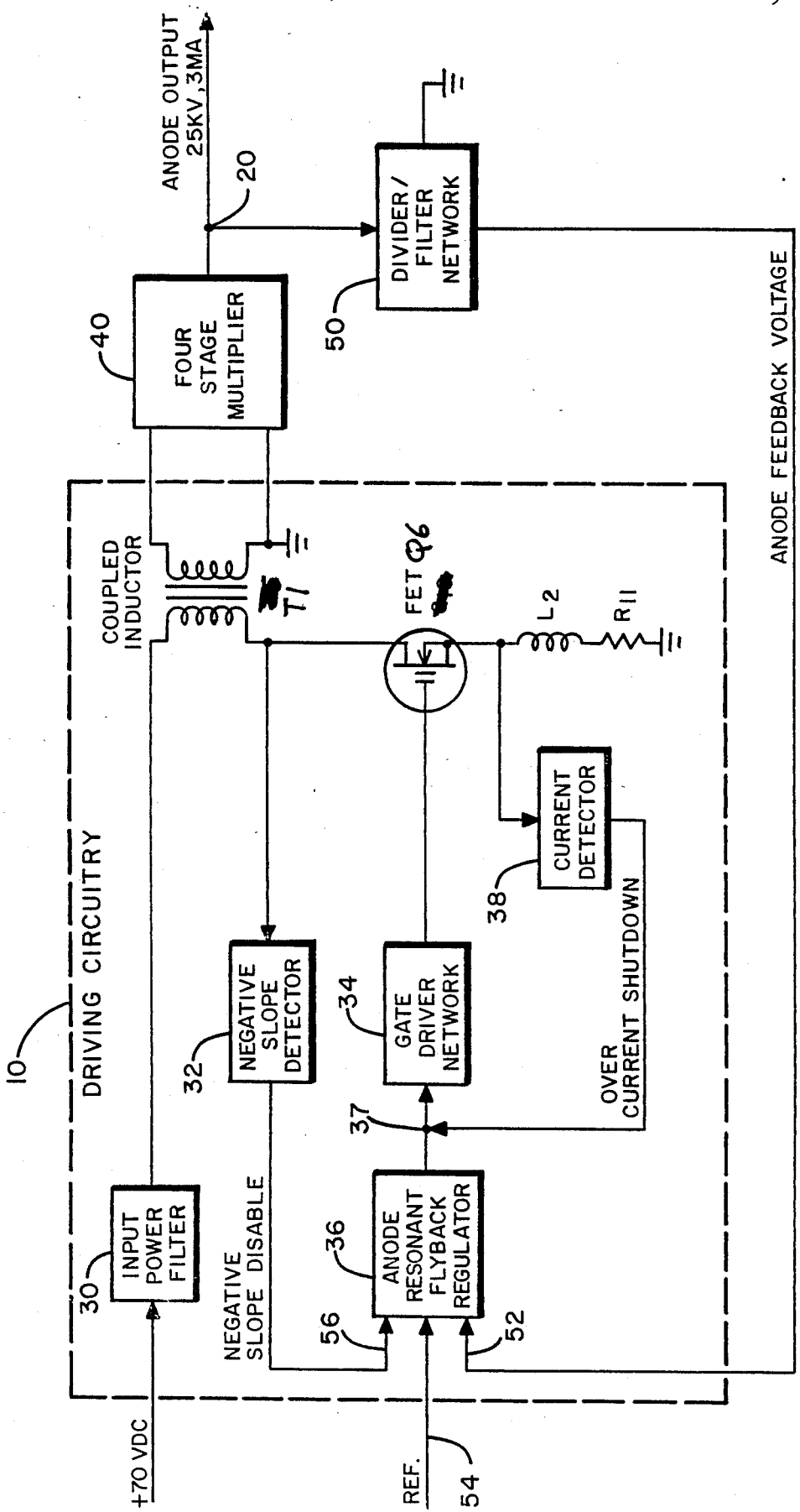
FIG. 1 illustrates a block diagram of one example of a high voltage power supply incorporating the synchronization circuit for a resonant flyback high voltage supply of the invention.
Figure 2:
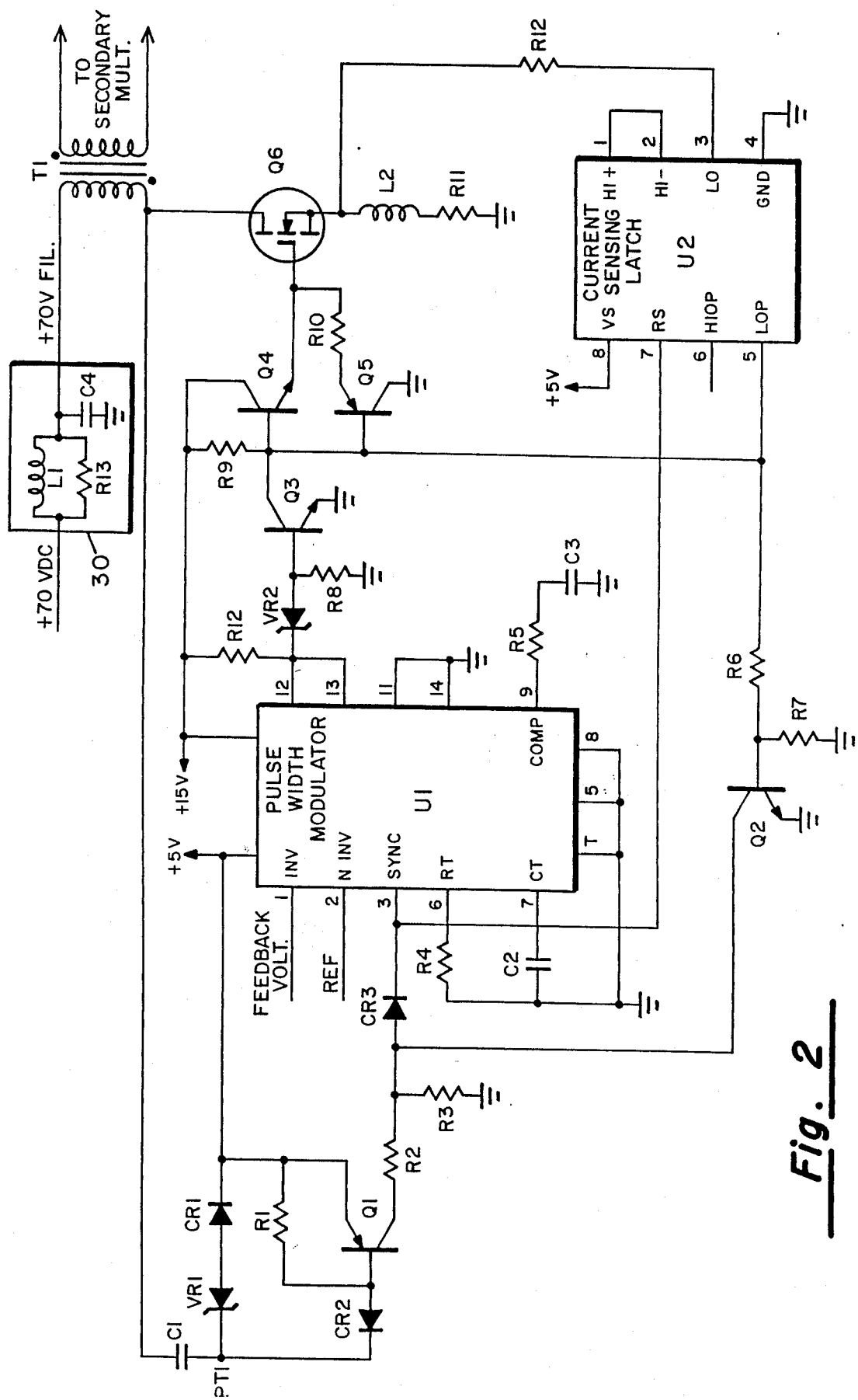
FIG. 2 schematically shows one example of a circuit layout for a high voltage power supply incorporating the invention.

An illustrative example of the invention as shown schematically in FIGS. 1 and 2 will be used herein to explain the teachings of the invention. It is to be understood that the apparatus shown in FIGS. 1 and FIGS. 2 are used herein as an illustrative example only, and the invention is not limited to these illustrative embodiments. Those skilled in the art will recognize that there are many alternative means for achieving the invention.

Referring now to FIG. 1, a block diagram of a high voltage power supply employing the synchronization circuit for a resonant flyback high voltage supply of the invention is shown. The voltage supply used in this illustrative example was a supply developed by Honeywell Inc., Defense Avionic Systems Division of Albuquerque, N. Mex. for use in developing an anode output of 25 kV and capable of delivering 3 ma of current.

In describing the invention, first of all a comprehensive explanation of the supply will be developed with reference to FIG. 1. This will be followed by a component level analysis in order to show specific details of both the overall design and the synchronization circuit itself.

Figure 4:
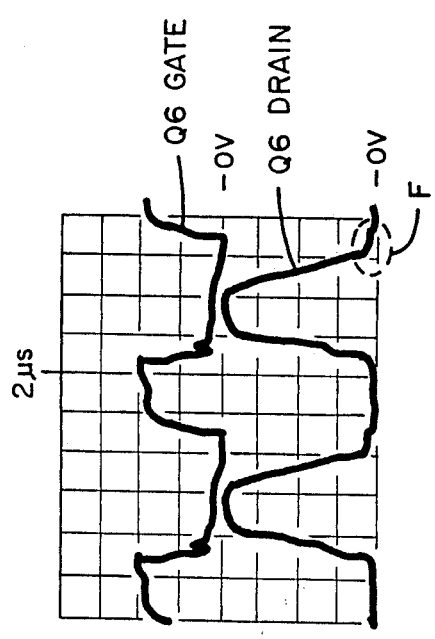
FIG. 4 graphically shows gate and drain voltages under full load conditions for the power switch FET shown in FIG. 1.

Still referring to FIG. 1, the block diagram of this illustrative example of a high voltage power supply incorporating the invention comprises driving circuitry 10, which is further comprised of input power filter 30, coupled inductor T1, negative slope detector 32, power switch transistor Q6, gate driver network 34, anode resonant flyback regulator 36, current detector 38, inductor L2 and resister R11. Responsive to the driving circuitry 10 are four-stage multiplier 40 and divider filter network 50. The negative slope detector 32 further comprises the synchronization circuit of the invention as shown in more detail with respect to FIG. 2. The power for the anode output at node 20 is derived from a positive 70 volt DC input to the input power filter 30. As shown in FIG. 2, input power filter 30 is comprised of an inductor L1 in parallel with a resistor R13, both of which are further connected to a capacitor C4. The capacitance in the input power filter supplies high AC current from a noninductive source. The induction in the input power filter minimizes high AC currents in the power supply input. When the power switch transistor Q6 is turned on, current passes through the coupled inductor T1 causing energy to be stored in the core and core gap of the inductor T1 while also supplying current to the four stage multiplier. Q6 is preferably a field effect transistor of the type typically used in high voltage power supplies such as a type IRF450. However, those skilled in the art will recognize that other types of transistors, such as bipolar transistors can be used as the power switch transistor. Once enough energy has been stored by the coupled inductor T1, Q6 shuts off causing a resonant flyback waveform to be generated in the coupled inductor T1. In one illustrative embodiment of the invention a 6250 Vpp waveform was developed on the coupled inductor secondary and passed through the four stage multiplier 40 to produce a 25 Kv anode output. It will be recognized by those skilled in the art that by varying parameters typically used in power supply circuits the output of the anode may also be designed to be various high voltage levels depending upon the requirements of the CRT being driven. A feedback voltage is provided by a divider/filter network 50 which is used for the feedback loop stabilization and control. The anode feedback voltage of the divider filter network 50 is fed back to a first input 52 of the anode resonant flyback regulator 36. The anode feedback voltage is compared to a reference voltage connected to the regulator 36 at a second input 54 in order to determine coupled inductor charging time, which is equivalent to the FET on time needed to maintain a 25 Kv anode output. Longer charging times increase the energy stored in the coupled inductor core and, thus, more energy is transferred during flyback. Anode load determines the charging time needed for the coupled inductor T5. As best can be seen with reference to FIGS. 3 and 4, longer periods result when the anode load increases. This is due primarily to the increased coupled inductor charging time needed to meet the load requirements.

In order to allow for period variations, the anode resonant flyback regulator 36 must be disabled during a portion of each period and reset to a known state. The disable function implemented at input 56 consists of the synchronization circuit for a resonant flyback high voltage supply which is included in the negative slope detector 32. The synchronization circuitry utilizes the relationship $$i = C(dv/dt) \tag{1}$$

in order to disable the anode resonant flyback regulator 36. The network detects the negative slope of the flyback waveform and by utilizing the current produced in accordance with the equation (1), disables the regulator 36 until the flyback is completed. Upon completion of the flyback, regulator 36 is then able to operate in its normal mode. A series RL current sense network is connected between FET Q6's source and ground to detect excessive current passing through the FET Q6. When the current detector 38 trigger level is reached, the gate driver network 34 is shut down via node 37 turning the FET Q6 off.

Now referring to FIG. 2, a more detailed schematic of an illustrative embodiment of a high voltage power supply employing the invention is shown. The discussion which follows groups the various components shown in FIG. 2 into groups corresponding to the blocks illustrated in FIG. 1.

Now with reference to FIGS. 1 and 2, the input power filter 30 includes an LC network, L1, C4 and R13 comprised of elements well-known in the art to reduce high frequency noise by introducing a double pole at 10 KHz. Resistor R13 placed in parallel with the inductor advantageously provides damping for the LC network. The negative slope detection circuitry 32 from FIG. 1 consists of VR1, R1, R2, R3, R6, R7, CR1, CR2, CR3, C1, Q1, and Q2 as shown in the embodiment illustrated in FIG. 2. The basic function of the negative slope detection circuitry is to disable pulse width modulator U1 during the falling slope of the flyback waveform by pulling the voltage of U1 SYNC "high" and to reset U1 until the dv/dt of the negative slop is equal to 0. U1 may be any standard regulating pulse width modulator such as SG1524 as manufactured by Silicon General Company. The voltage on both sides of capacitor C1 nearly equals the flyback voltage as it begins to rise, in this example, from 4.3 volts (due to initial conditions determined from the previous cycle) because there is no initial current path. Once Point 1 (PT 1) in FIG. 2 has reached 56.7 volts, the sum of Vzk(VR1)+Vf(CF1)+5(+5V Supply), PT 1 becomes clamped to this value and current passes through VR1 and CR1 into the +5 volt supply.

Figure 5:
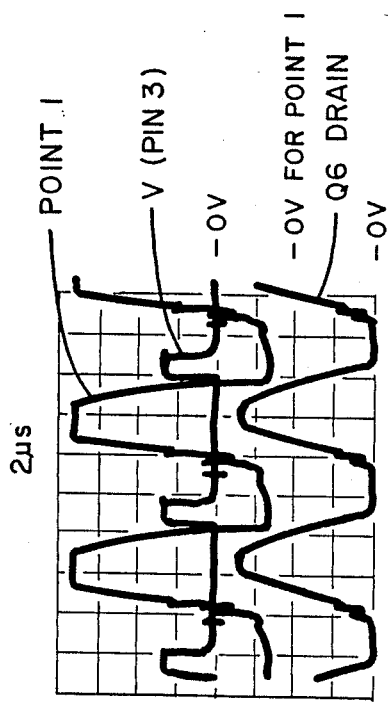
FIG. 5 graphically shows three waveform measured at Point 1 on FIG. 2, the disabled signal at U1 Pin 3 and the drain waveform at Q6.

FIG. 5 compares the flyback waveform to the clamped waveform at PT 1. PT 1 remains clamped to 56.7 volts during the portion of the rising flyback waveform above 56.7 V. During the beginning of the falling flyback waveform, voltage on both sides of C1 decreases in voltage at the same rate because no current can be supplied to C1 at PT 1. This is due to CR2 being reversed biased and also due to the fact that current cannot be sourced from the +5 Volt Supply through CR1. When PT 1 has fallen to a diode drop (CR2) below the +5 volt supply, current passes through R1 and CR2 to C1. The current that passes through R1 forward biases the emitter to base voltage, Veb of Q1, turning Q1 on. Current from Q's collector is driven through R2 and R3 producing a 3 volt signal at U1 SYNC. This signal is shown in FIG. 5 and is read as a "high" input signal. This causes the output transistors of U1 to remain off and resets U1 which in turn keeps the FET Q6 off until the dv/dt of the negative slop has reached 0.

Selection of C1 and the dv/dt rate of the falling slope of the flyback waveform determines the values of R1, R2 and R3. Calculations for determining the voltage at pin 3 is as follows:

$$I(CR2,C1) = \tag{2}$$

C1(flyback voltage drop during CR3 conduction time ÷

CR3 conduction time) = 27 pF(110V/1.4us) = 2.12 mA $$I(R1) = 0.7 \text{ V}/442 = 1.58 \text{ mA} \tag{3}$$

$$Ib(Q1) = (2.12 - 1.58)\text{mA} = 0.54 \text{ mA} \tag{4}$$

Assume Q1 is in saturation, thus:

$$Vec(Q1) = 0.5 \text{ V} \tag{5}$$

$$Vc(Q1) = 5 - .5 = 4.5 \text{ V} \tag{6}$$

$$Ic = Vc(Q1)/(R2 + R3) = 4.5 \text{ V}/5.02 \text{ kohm} = 0.90 \text{ mA} \tag{7}$$

$$\beta = Ic/Ib = .9 \text{ mA}/.54 \text{ mA} = 1.66 \tag{8}$$

Equation (8) shows that Q1 operates in saturation, thus:

$$V(R3)=(5-0.5)[(4.02k/(4.02k+1k)]=3.60 \text{ volts} \tag{9}$$

Equation (9) shows that ample voltage is presented to the anode of CR3 for triggering U1 SYNC. By operating Q1 in saturation, there is no dependence upon the variation of V(Q1) involved during CR3 conduction time.

The synchronization circuit detects the negative going slope of the flyback waveform and keeps the FET Q6 off until the flyback has totally completed its resonant cycle. When the drain of Q6 reaches 0 volts a strong gate drive is applied to turn Q6 fully on thereby reducing Rds to its specified minimum. Since the drain is at 0 volts when Q6 is turned on, power dissipation in Q6 is only due to Ids*Rds loss, where the current is that used to charge the coupled inductor. Ids is the current flowing from drain to source in 06. Known prior art designs turned the FET on at increasing drain voltages to meet increasing charging times required for higher anode output load requirement. That type of operation enlarges power dissipation in the FET to include both coupled inductor charging current through Rds plus the initial drain voltage drop across Rds when the FET is first turned on.

Figure 6:
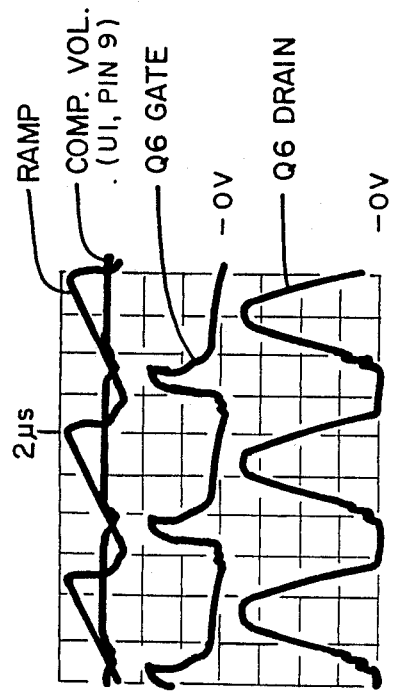
FIG. 6 graphically shows waveforms measured from one example of an embodiment of the circuit of FIG. 1.

The anode resonant flyback regulator of this illustrative embodiment of the invention consists of R4, R5, C2, C3 and U1. The network of R4 and C2 creates a ramp as shown in FIG. 6 which is compared to the compensation voltage of U1 pin-9 to determine charging time for the coupled inductor. R4 and C2 are arranged to provide a ramp network which is connected to first and second ramp inputs U1 pin 6 and pin 7. FIG. 6 shows the voltage ramp and the voltage at U1, COMP, pin 9. Note that while the ramp is rising but still below the compensation voltage present on U1 COMP, the coupled inductor is being charged (i.e. the gate of Q6 is on). Once the ramp rises above the pin 9 voltage level, the gate is shut toff causing flyback to occur. The U1 COMP compensation voltage is determined by comparing the feedback voltage to a fixed reference voltage introduced at Pins 1 and 2 respectively. As the feedback voltage falls below the reference voltage, the voltage at U1 COMP will rise so that the charging time for the coupled inductor will increase. This increases energy storage in the core of T1 and, thus, more energy transfer to the secondary T1. As more energy is passed to the secondary of T1, the anode output voltage rises and the feedback voltage rises, driving the voltage at U1 COMP down. The series RC network attached to U1 COMP stabilizes the compensation voltage and, therefore, the entire feedback loop.

When U1 SYNC, Pin 3, is pulled high to disable U1, C2 is discharged as shown in FIG. 6. Note that the slope of the discharge at U1 CT is determined by C2 and an internal resistor in U1. When U1 returns to normal operation, the ramp is at its lowest level, about 0.5V. Since this voltage is below the compensation voltage at U1 COMP, the FET turns on when U1 SYNC goes low as controlled by the synchronization circuit.

A few unwanted characteristics are inherent in the coupled inductor T1 and FET Q6 and must be examined in order to understand the reasoning behind some of the component selections. A coupled inductor always has a leakage inductance due to magnetic fields which do not couple primary to secondary. This inductance will generate a flyback waveform at a resonant frequency of:

$$Freq = 1/[2\pi(Lleakage * Cparasitic)^{\frac{1}{2}}] \qquad (10)$$

Since Lleakage<<Lprimary the flyback frequency due to Lleakage is much faster than that caused by Lprimary. Both flyback waveforms can be seen in FIG. 3. The main waveform is due to the resonating of Lprimary and Cparasitic, and the small spike S on the lower rising edge is due to the resonating of Lleakage and Cparasitic. Because the synchronization circuit detects negative dv/dt, the falling side of the leakage spike must be ignored while still reacting to the main flyback waveform. Circuitry used to ignore the falling side of the spike was incorporated into the negative slope detector and is discussed below.

FETs have a small resistance between the drain and source while in the "on" state which increases as the gate voltage is lowered. As current passes through this resistance, power is dissipated in the device. Excessive power dissipation will decrease efficiency and in extreme cases destroy the device. While the FET is off, the drain voltage is that of the flyback waveform. If the gate goes high at this time, a large voltage will drop across the small resistance between drain and source. A large current will develop in this situation and destroy the FET. Features within the negative slope detection circuitry of the invention guard against this situation.

Voltage drop on the negative going slope to the leakage inductance spike S determines the minimum zener voltage to be used for VR1. PT 1, as shown in FIG. 2 will rise with the flyback waveform until Vzk is reached and is then clamped to this value. If the falling side of the leakage inductance spike S is greater than Vzk, then Cr2 will become forward biased and turn on Q1, driving pin 3 (U1) high. C2 will discharge and the ramp will be reset to its lowest level. The FET will then try to turn on during flyback and a high voltage (i.e., the flyback voltage) will be dropped across the FET, destroying the device. Thus Vzk of VR1 must be greater than the voltage fallen on the negative side of the leakage spike.

Figure 3:
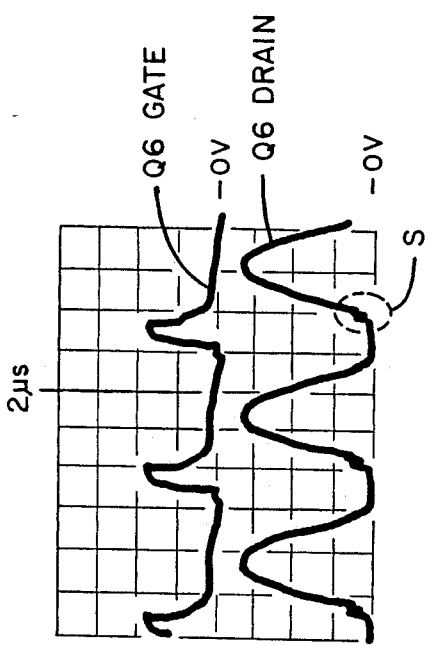
FIG. 3 graphically shows gate and drain voltages under noload conditions for the power switch FET Q6 of the circuit in FIG. 1.

FIG. 3 shows the leakage spike S developed by the coupled inductor currently used in one embodiment of the invention. The particular coupled inductor in this experiment had very low leakage and, thus, the spike was very small (10V). Therefore, PT 1 did not reach Vzk of VR1 before the leakage spike occurred. As leakage increases the spike height will increase because the larger Lleakage can store more energy. Therefore, Vzk must be larger than the worst case leakage spike expected on the drain flyback waveform.

Q2, R6 and R7 serve to stop any false triggering of U1 SYNC while the gate is turning on. Base drive is provided to Q2 as the gate goes high. Q2 turning on at this time prevents false triggering of the synchronization circuit under heavy loads. This can be seen by the fall-out F at the end of the drain waveform in FIG. 4. Note that voltage is present at the drain while the gate is turning on. During this time Q1 could erroneously turn on due to current drawn by C1. But Ic(Q1) will not trigger U1 SYNC because Q2 will draw this current into its collector and away from R3.

The gate driver network 34 is the next unit to be analyzed. pins 11 and 12, 13 and 14 are connected within U1 to NPN transistors (not shown) which turn on when the ramp of U1 CT is below the compensation voltage of U1 COMP. When the output transistors are on the voltage at pins 12 and 13 is approximately 2.0V. Since this is below Vzk(VR2) Q3 must be off because no base drive is supplied. It follows that Q4 turns on because base drive is provided by the +15V through R9. Q4 charges up the gate, turning on the FET Q6. When the ramp on pin 7 is greater than the compensation voltage of pin 9, the output transistors of U1 turn off and pins 12 and 13 float at the voltage set by +15V, Vzk(VR2), R8, R12 and Vbe(Q3). Current supplied by the +15V external supply passes through R12, VR2, and into R8 which in turn drives Vb(Q3) up. Q3 is driven into saturation. Vc(Q3)=0.3V. The gate voltage is then driven to 0V by discharging it through Q5 and R10 thereby shutting off the FET. R10 is a key element in limiting the inductance flyback voltage by slowing down the Q6 turn-off time.

The final block is the current detector 38. This unit provides period by period current limiting to guard against driving excessive current loads and shorts on the coupled inductor primary, secondary and Q6. Three different source current waveforms are included in FIG. 7 to facilitate reasoning behind the series RL network. From top to bottom, they are:

(1) No load current (0mA at the anode), FIG. 7A;

(2) Full load current (3mA at the anode), FIG. 7B; and (3) Current due to a shorted T1 primary, FIG. 7C.

Resistor R11 generates a voltage directly proportional to I(R11). It provides adequate limiting against excessive loads because the rate di/dt for full loads rises slowly enough to allow U2 to detect overcurrent conditions and pull the gate low before the source current approaches the limit of Ids(Q6). Under excessive load conditions Ids(Q6) triggers U2 at 7 amperes and pulls the gate down before Ids has reached 8 amperes. L2 does not have much effect under no load and full load conditions because the di/dt is fairly slow. Under short circuit conditions di/dt is very rapid. If only R11 is used Ids will trigger U2 at 7A but the gate will not be pulled low until Ids is 16 amperes. Q6 will not last long under these conditions. By using L2 to sense rapid di/dt, the triggering of U2 occurs when Ids=2 amperes and shuts down the gate when Ids=4 amperes. Q6 will typically survive this situation.

U2 is a current sensing latch circuit which senses the current through Q6. In the illustrative embodiment of the invention, U2 comprised a model SG1549 integrated circuit as manufactured by Silicon General company.

U2 must be reset each period in order to provide period by period current limiting in order to prevent Q6 from turning on before the next period. This is achieved by running the sync pulse generated at U1 SYNC, pin 3 into the reset RS U2, Pin 7. The sync pulse generated at U1 SYNC is shown in FIG. 5.

Figure 8:
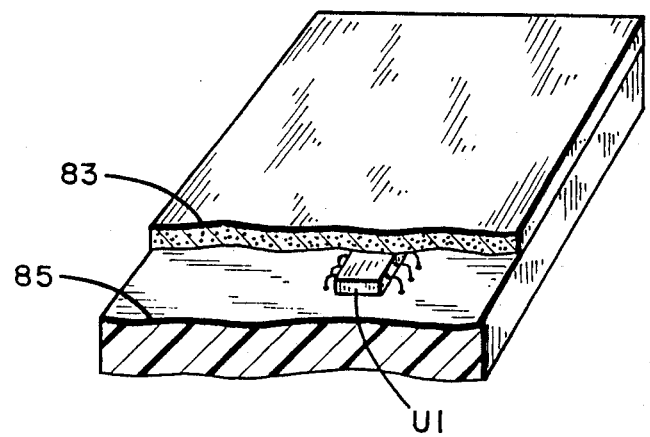
FIG. 8 is a cutaway view which schematically illustrates the use of potting to encapsulate components used in the invention.

Those skilled in the art will recognize that in the preferred embodiment both voltage components used in this invention must be encapsulated to ensure that the invention is adapted to work properly for its intended use. This is accomplished by encapsulating the components by potting them in a rigid encapsulant such as STYCAST ™ 2850 FT or other suitable potting material well known in the art. Such encapsulation is shown schematically in FIG. 8. Potting 83 is used to encapsulate components such as U1. U1 is mounted on printed wiring board 85 or an equivalent substrate.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. A synchronization circuit for a resonant flyback high voltage supply having a power switch transistor and a coupled inductor for use in providing a high voltage output comprising:
   (a) means for filtering input power having a filtered output terminal;
   (b) coupled inductor means having primary and secondary windings where the primary winding includes a first terminal connected to the filtered output terminal and also incudes a second terminal;
   (c) a first capacitor, first, second, third, fourth and fifth resistors, first, second and third diodes, a first zener diode and first and second transistors arranged to provide a negative slope detector wherein a first terminal of the first capacitor is electrically connected to the second primary winding terminal;
   (d) means for providing pulse width modulation including a syncronous input connected to the cathode of the third diode and further including a compensation input, a feedback voltage input, a reference voltage input, first and second ramp inputs and an output where the first and second ramp inputs are connected to a ramp network;
   (e) a second zener diode having a cathode connected to the pulse width modulation output;
   (f) a third transistor having a base connected to the anode of the second zener diode and including a collector;
   (g) a sixth resistor also connected to the base of the third transistor;
   (h) a fourth transistor having a collector connected through a seventh resistor to the pulse width modulator output and having a base connected to the collector of the third transistor;
   (i) a fifth transistor having a base connected to the base of the fourth transistor and to one terminal of the fifth resistor;
   (j) an eighth resistor connected between the emitter of the fifth transistor and the emitter of the fourth transistor;
   (k) means for switching having a first terminal connected to the emitter of the fourth transistor, a second terminal connected to the second terminal of the primary winding and having a third terminal;
   (l) a second inductance means connected to the third terminal of the switching means;
   (m) a ninth resistor connected in series with the second inductance means;
   (n) current sensing latch circuit means including a low input connected through a tenth resistor to the third terminal of the switching means, further including a reset input connected to the synchronous input, and an output connected to the base of the fifth transistor;
   (o) means for multiplying the voltage coupled through the coupling means at the secondary winding of the coupling means, the multiplying means providing a voltage output; and
   (p) means for filtering and dividing the voltage output of the multilying means having an anode feedback voltage output connected to the feedback voltage input.

2. The apparatus of claim 1 wherein the power switching means comprises a transistor.

3. The apparatus of claim 1 wherein the power switching means comprises a field effect transistor.

4. The apparatus of claim 1 wherein all of the elements are encapsulated by potting material.

* * * * *